United States Patent
Kinsella et al.

(10) Patent No.: US 9,590,536 B2
(45) Date of Patent: Mar. 7, 2017

(54) TWO-STEP CONNECTION OF ELECTRIC MOTORS BY MEANS OF ELECTROMAGNETIC SWITCHES

(71) Applicants: James J. Kinsella, Pleasant View, TN (US); Peter Unsworth, Lewes (GB)

(72) Inventors: James J. Kinsella, Pleasant View, TN (US); Peter Unsworth, Lewes (GB)

(73) Assignee: Rockwell Automation Technolgies, Inc., Milwaukee, WI (US)

( * ) Notice: Subject to any disclaimer, the term of this patent is extended or adjusted under 35 U.S.C. 154(b) by 161 days.

(21) Appl. No.: 13/815,863

(22) Filed: Mar. 15, 2013

(65) Prior Publication Data

US 2014/0265995 A1 Sep. 18, 2014

(51) Int. Cl.
| | | |
|---|---|---|
| H01P 1/16 | (2006.01) | |
| H02P 1/26 | (2006.01) | |
| H02P 1/32 | (2006.01) | |
| H01H 50/54 | (2006.01) | |
| H01H 1/20 | (2006.01) | |

(52) U.S. Cl.
CPC ............. *H02P 1/26* (2013.01); *H01H 1/2016* (2013.01); *H01H 50/54* (2013.01); *H02P 1/32* (2013.01)

(58) Field of Classification Search
CPC .......... H02P 1/26; H02P 1/32; H01H 1/2016; H01H 50/54
USPC .......... 318/778, 790, 519, 400.23, 128, 727; 361/160, 191, 171, 195, 139
See application file for complete search history.

(56) References Cited

U.S. PATENT DOCUMENTS

| | | | |
|---|---|---|---|
| 4,471,183 A | | 9/1984 | Bauer et al. |
| 5,430,599 A | * | 7/1995 | Charpentier ......... H01H 33/593 361/152 |
| 6,956,728 B2 | * | 10/2005 | Zhou et al. .................... 361/160 |
| 6,967,549 B2 | | 11/2005 | Zhou et al. |
| 7,196,434 B2 | | 3/2007 | Zhou et al. |
| 7,224,557 B2 | * | 5/2007 | Kinsella .................... H01H 9/40 361/2 |
| 7,317,264 B2 | * | 1/2008 | Kinsella ........... H03K 19/17728 307/139 |
| 7,576,957 B2 | | 8/2009 | Zhou et al. |
| 7,812,563 B2 | * | 10/2010 | Unsworth ................. H02P 1/24 318/729 |
| 7,977,824 B2 | * | 7/2011 | Halen ..................... H01H 9/541 307/130 |
| 8,305,024 B2 | * | 11/2012 | Unsworth et al. ............. 318/519 |
| 2001/0022508 A1 | | 9/2001 | Lang et al. |
| 2005/0013085 A1 | | 1/2005 | Kinsella et al. |

FOREIGN PATENT DOCUMENTS

| | | |
|---|---|---|
| CN | 1354885 A | 6/2002 |
| CN | 201365218 Y | 12/2009 |

(Continued)

OTHER PUBLICATIONS

Office Action for CN Application No. 20140098783.1 mailed Apr. 13, 2016.

(Continued)

*Primary Examiner* — Rita Leykin
(74) *Attorney, Agent, or Firm* — Fletcher Yoder P.C.

(57) ABSTRACT

A method and apparatus using electromagnetic switching in a two-step connection process is provided to minimize surge currents and torque oscillations in three-phase motors during starts.

20 Claims, 14 Drawing Sheets

(56) References Cited

FOREIGN PATENT DOCUMENTS

| CN | 102368672 A | 3/2012 |
|---|---|---|
| DE | 951020 C | 10/1956 |
| JP | S63184225 A | 7/1988 |
| WO | 2006035194 A2 | 4/2006 |

OTHER PUBLICATIONS

Office Action for CN Application No. 201410099213.4 mailed Apr. 13, 2016.
Extended European Search Report for 14160339.9 mailed Dec. 8, 2015.

* cited by examiner

TWO-STEP CONNECTION OF ELECTRIC MOTORS BY MEANS OF ELECTROMAGNETIC SWITCHES

TECHNICAL FIELD

The present disclosure relates in general to the control, protection, and starting of three-phase electric motors and driven equipment and more particularly to a two-step connection of electric motors by means of electromagnetic switches.

BACKGROUND

The vast majority of three-phase motor starters are simple devices using contactors that connect and disconnect all phases of a three-phase power supply to a motor at substantially the same time. This simultaneous application of the three-phase supply results in high peak surge currents and torque pulsations which place undue, and potentially destructive, stresses on the power distribution network, motor, and driven load. These surge currents are additional to the normal in-rush currents and can damage the electrical contacts used in the starter contactor and reduce the life of the starter. In order to avoid nuisance trips because of the higher peak currents caused by these surge currents, it is common practice to set higher trip levels on circuit breakers in the power distribution network than those needed to support the nominal load. This reduces the breaker's ability to minimize damage in the event of a fault condition. While alternative approaches to starting motors (such as motor drives and electronic soft starters) exist that reduce or eliminate these negative attributes, these alternatives are typically larger, more expensive, more complex to install and configure, and have shorter useful lives than electro-mechanical starters.

SUMMARY

Embodiments contain electromagnetic switches providing a two-step connection process resulting in some windings of the motor experiencing current flow before the remainder of windings experience current flow. Two such possible embodiments of providing two-step switching are described. One embodiment uses Single Pole Switches (SPS). Another embodiment uses a Delayed Pole Contactor (DPC) comprised of three poles with one pole designed to close at an offset in time relative to the closing of the other two poles. At present, both embodiments use DC electromagnets controlled by electronic means, though other means capable of controlling the operation of the switches are also satisfactory.

BRIEF DESCRIPTION OF THE DRAWINGS

For a more complete understanding of the present disclosure and the advantages thereof, reference is now made to the following detailed description taken in conjunction with the accompanying drawings, wherein like reference numerals represent like parts, in which.

DETAILED DESCRIPTION

Figure 1:
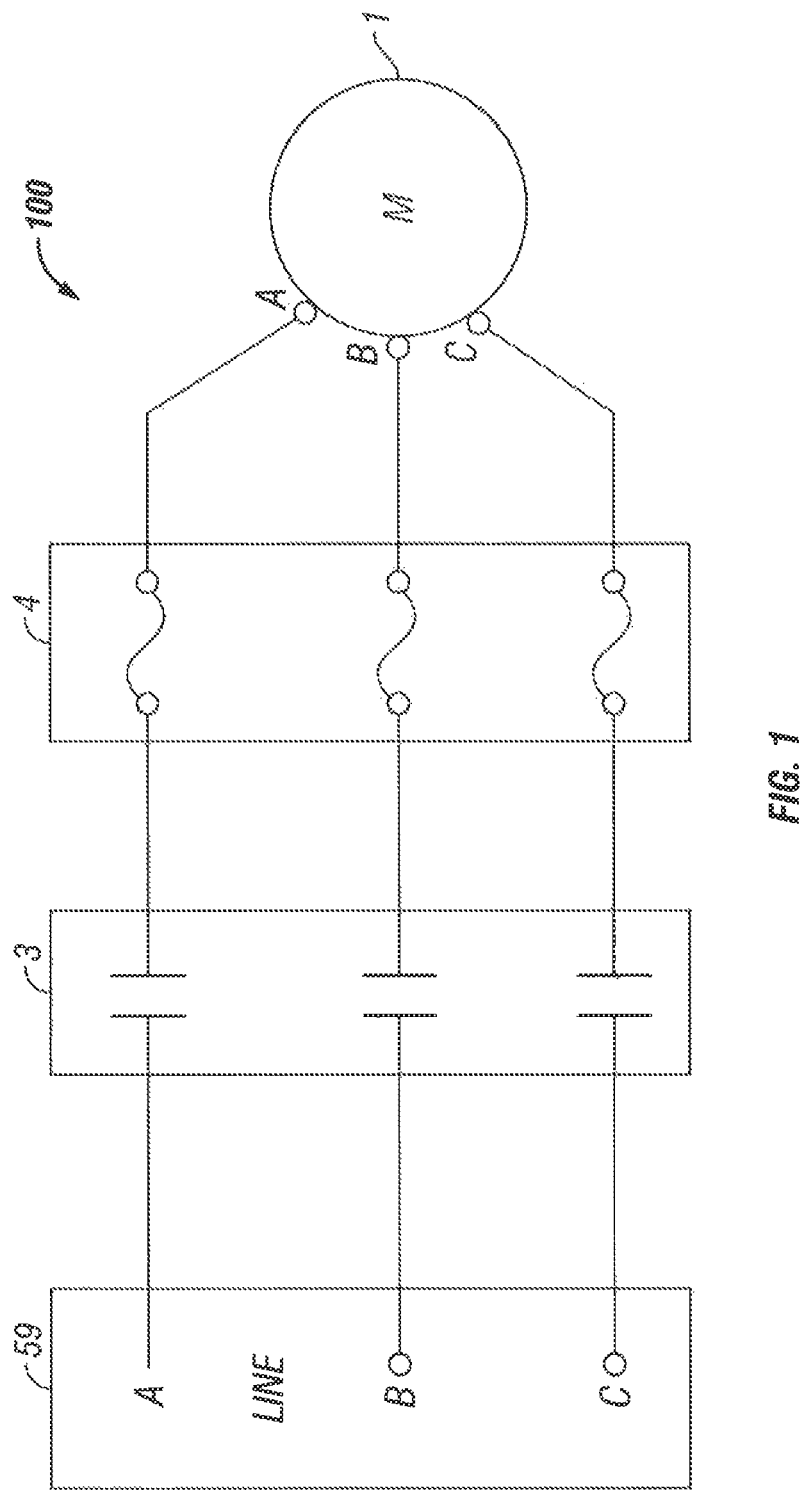
FIG. 1 illustrates a motor branch circuit assembly.

When an electromagnetic contactor is used to start an induction motor from rest, the motor typically draws a starting current from the supply that is between six and ten times the motor full load current (FLC), depending on the size and construction of the motor. As the motor approaches full speed, the current falls to a lesser value commensurate with the load on the motor.

However, a number of undesirable phenomena also occur during the simultaneous connection of the supply to the motor. There is a severe oscillatory pulsation in torque generated by the motor that can last up to several seconds in larger motors. This imposes a high mechanical stress on the whole drive train (especially on shaft couplings, gearboxes, bearings, and stator windings) through the reaction force that is experienced. The peaks in the pulsating torque can be both positive and negative, and many times at the maximum torque experienced under normal running. This pulsating torque is a significant factor in causing breakdown, especially in motors subject to frequent starting.

Just as serious is the fact that, during the transient period of torque pulsation, supply current peaks can exceed twice the expected steady state locked rotor starting current. This abnormally high current is known as surge current and can cause problems for motor protection. Generally, motor starters combine a contactor with overload protection to disconnect the motor if it draws excessive current. The overload mechanism must allow for the high surge current without disconnecting the motor prematurely but, nevertheless, be able to shut down the motor during running if it becomes overloaded and draws more than only 110% of full load current. With high efficiency motors, surge current can reach 18/20 times FLC, which complicates setting of overload relays and breakers to allow starting and still provide adequate running protection.

However, it is possible to greatly reduce or eliminate both the torque pulsation and the surge current by modifying the way in which the supply is connected to the motor. If a three-phase motor is connected by contactor poles placed between the supply and the motor terminals and operated such that two phases are connected first (when the line voltage between the two phases is at its peak value) and the remaining phase is connected a quarter of a supply voltage cycle later, both the torque pulsation and surge current are greatly reduced or eliminated.

When an induction motor is at rest, the internally generated back emf is zero. If the stator resistance $R_s$ is ignored, then when the supply is applied, current flow is determined by the stator inductance. If all three phases are energised together, the current flow is made up of the balanced steady state three-phase AC starting current that will flow plus an exponentially decaying DC transient current present in differing amounts in each phase. The amplitude of the DC transient is determined at the moment of connection when all currents are zero and their rate of change is limited by the motor inductance. At the instant immediately after connection, the motor currents are still zero. Hence, at this time, the steady state current and DC transient current are related by the following formula:

Steady state current+DC transient current=0

As the formula shows, the amplitude of the DC transient current is equal and opposite of the steady state starting current value at the instant immediately after connection. This DC current decays with the motor magnetization time constant.

The effect of the DC current is to cause the severe torque pulsation that accompanies motor starting. This happens because, instead of the uniformly rotating magnetic field that the steady state AC currents would produce, the DC transient introduces an additional non-rotating, decaying DC field component. This adds to the AC field when they are aligned but subtracts from the AC field as the stator field moves out of alignment with the DC field component. Instead of keeping a steady (rotating) value, the motor flux therefore oscillates between (AC flux+DC flux) and (AC flux−DC flux). This causes a severe oscillation in motor torque at supply frequency that only subsides as the DC flux decays away. This may last several seconds in larger motors.

A two-step connection process is able to eliminate surges due to the slow decaying excitation DC transient current and associated torque pulsation. For a wye-connected motor, two phases of the motor are first connected to the supply terminals to build up current in two of the motor windings so that, at the moment when the remaining phase is connected, all three currents are exactly equal to their steady state AC values corresponding to the point all phases are finally connected to the supply waveforms. If the currents are at the steady state value immediately before and after connection of the third phase, no additional DC transient current is generated, the motor starts with a balanced set of AC currents equal to the steady state locked rotor current, and the torque pulsation is absent.

In starting a motor from rest, the point in the supply waveform when the first two phases are connected must be chosen such that current in those phases builds up to reach exactly the steady state value required at the moment when the third supply phase is connected. As most three-phase motors have a winding impedance much greater than their winding resistance, this result can be approximately achieved by connecting two supply phases to the motor when line voltage between them is at its peak and the remaining phase is connected approximately 90 degrees (a quarter of a supply cycle) later.

FIG. 1 shows a motor branch circuit assembly 100. Motor branch circuit assembly 100 includes a motor, line voltage phase unit 59 with phases A, B, and C, a motor contactor 3, and an overload relay 4. For the disclosed embodiment, motor contactor 3 is replaced by either a Delayed Pole Contactor (DPC) or three independent Single Pole Switches (SPS).

Figure 2:
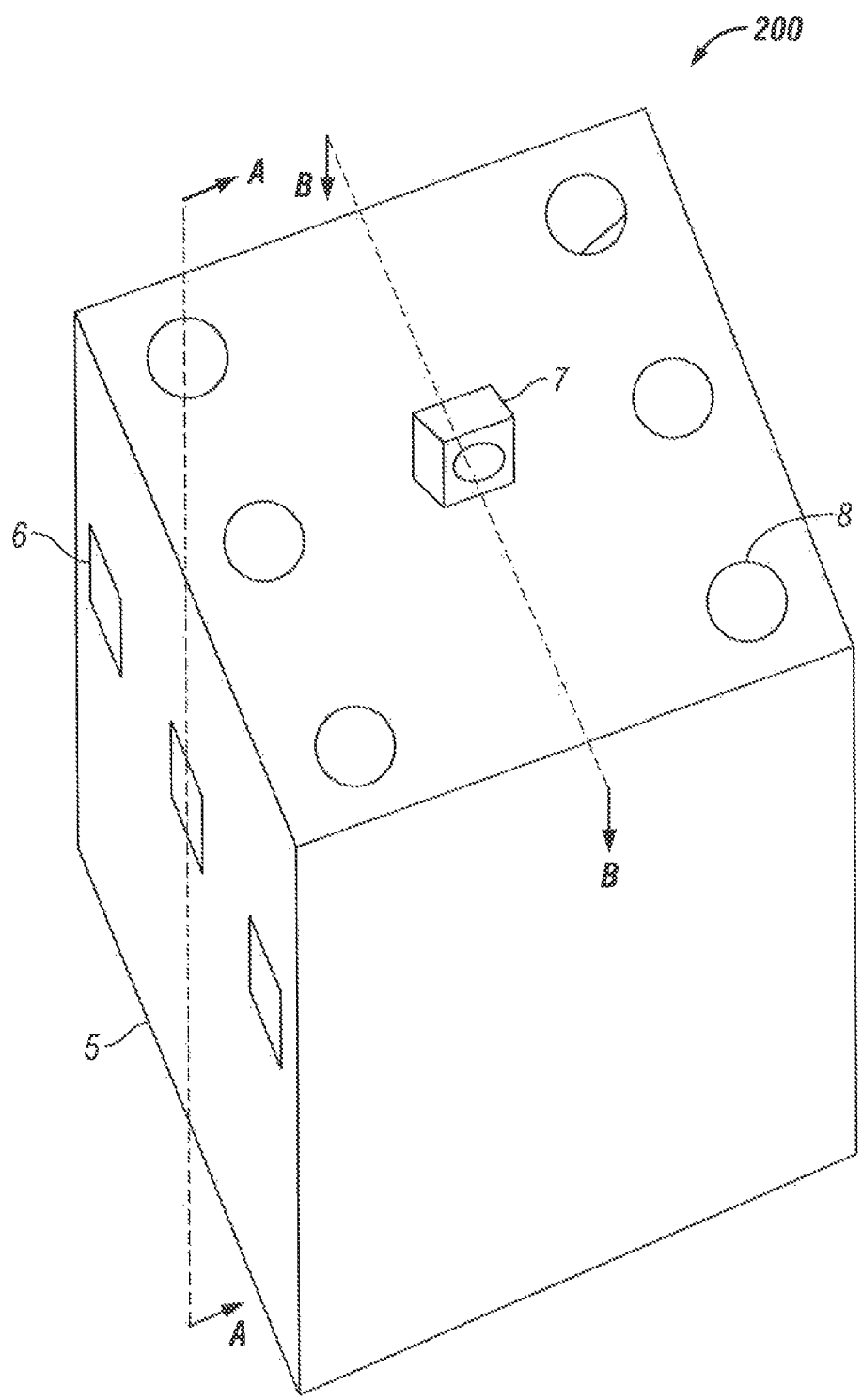
FIG. 2 illustrates an assembly which is an external view of an embodiment using a three-pole Delayed Pole Contactor (DPC)

FIG. 2 shows an assembly 200 which is an external view of one embodiment of a three-pole DPC. Assembly 200 includes an enclosure 5, combined terminations and fixed contacts 6, a moving contact carrier molding 7, and attachment points 8 where screws fasten wires into assembly 200.

Figure 3:
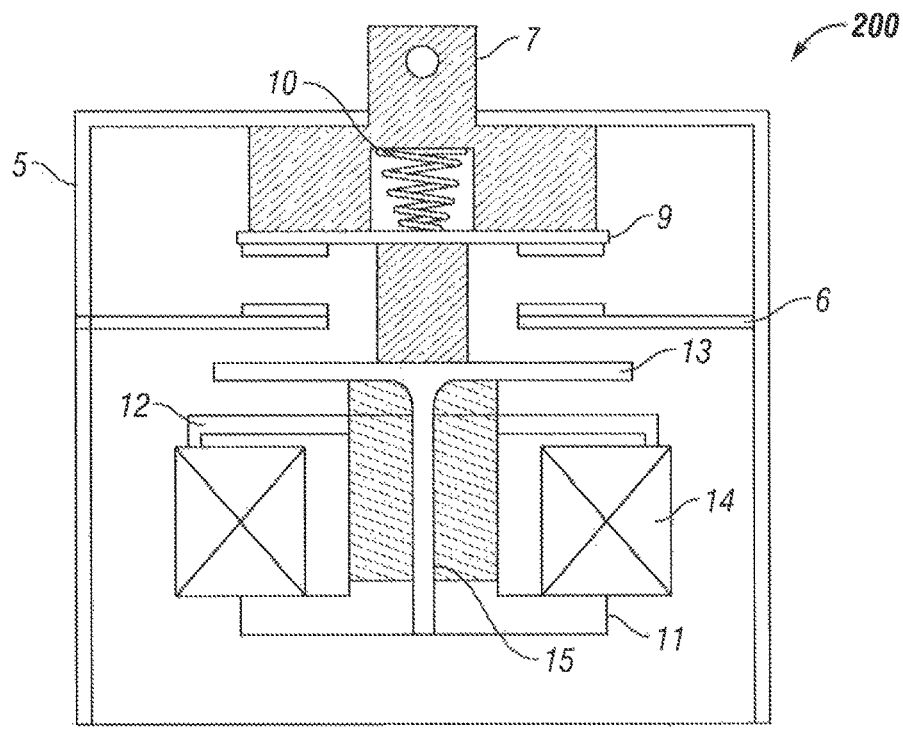
FIG. 3 illustrates a cross-section of the assembly of FIG. 2.

FIG. 3 illustrates a cross-section along line A-A assembly 200. Within assembly 200 lies a moving contact 9 a spring 10 that provides contact pressure on closing. An iron magnet frame 11 supports a magnet face 12 that mates with an armature 13. A coil 14 generates a magnetic flux and a spring 15 urges an actuating assembly away from magnet face 12 when the coil 14 is de-energized. Moving contact carrier molding 7 is physically attached to armature 13 such that they move together. Together, components 7, 11, 12, 13, 14, and 15 comprise the actuating assembly.

Figure 4:
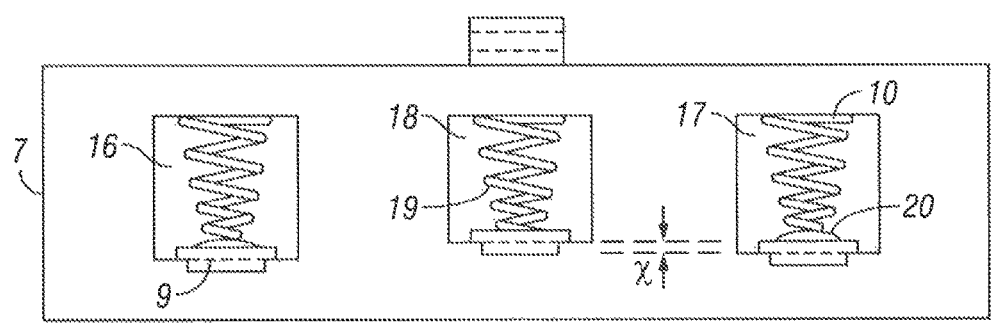
FIG. 4 illustrates another cross-section of the assembly of FIG. 2.
Figure 5:
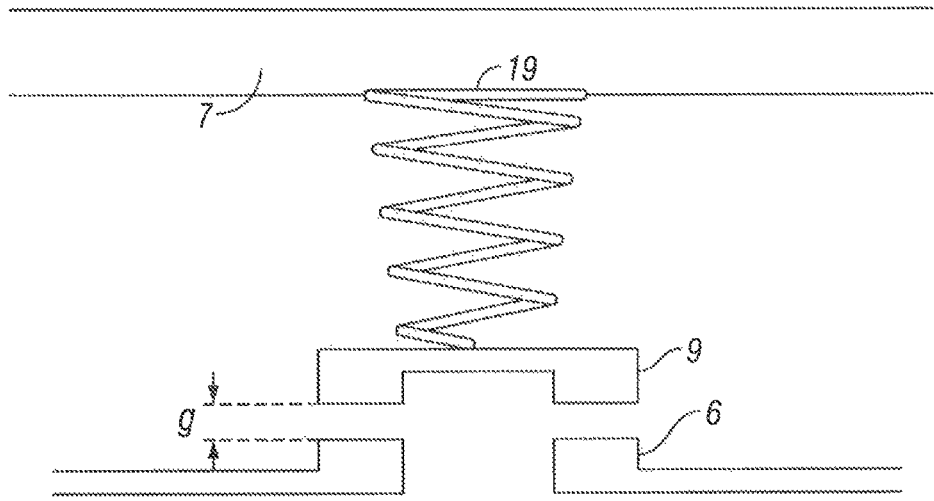
FIGS. 5 and 6 illustrate an operation of a center pole of the assembly.
Figure 6:
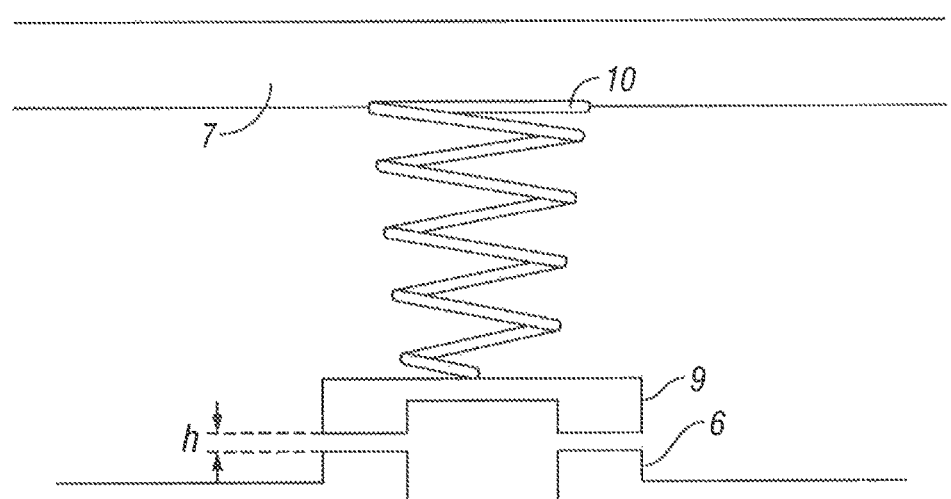

FIG. 4 is a cross-section along line B-B of assembly 200 showing moving contact carrier molding 7 with two identical outside poles 16 and 17 of the DPC and a center pole 18 that is physically offset by distance x so as to close at later time. A spring 19 is used to establish a contact closing pressure. Leaf springs 20 in poles 16 and 17 are used to establish initial contact pressure on closing. Though leaf springs 20 offer improved performance, it is equally suitable to eliminate them in a different embodiment and use only springs to establish initial contact pressure or use other compressible materials or manufactured items in their place. They may also be left out of poles designed to travel farther distances than the other poles. FIGS. 5 and 6 show operation of center pole 18.

In FIG. 5, center pole 18 in an open position has a contact gap g that is approximately equal to the sum of distance x in FIG. 4 and contact gap h in FIG. 6. In FIG. 6, center pole 18 has a smaller contact gap h. This position is obtained by advancing the actuating assembly the distance x towards magnet face 12.

Figure 7:
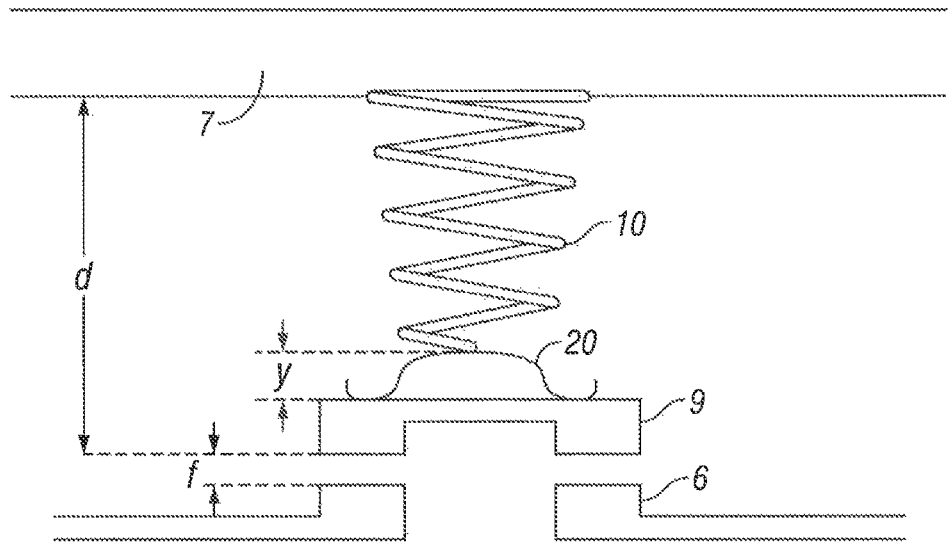
FIGS. 7 and 8 illustrate operation of an outside pole of the assembly.
Figure 8:
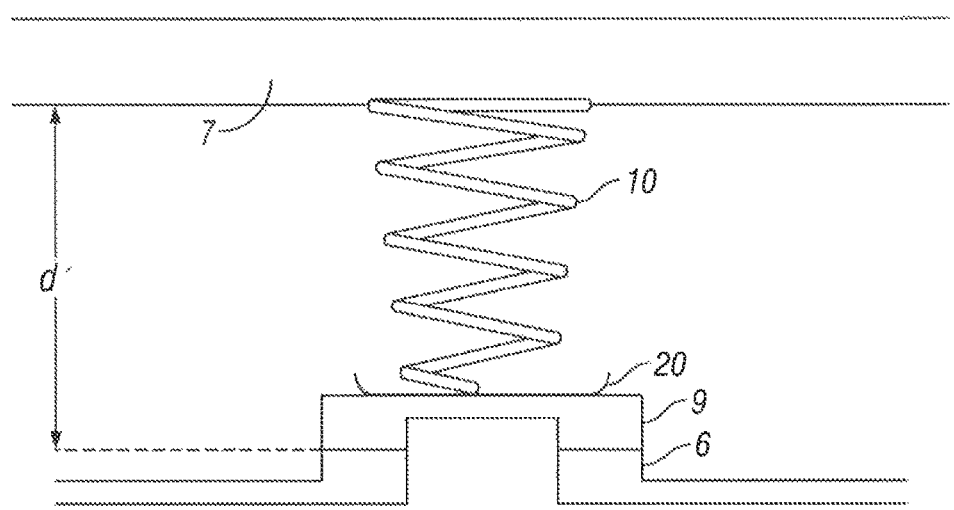

FIGS. 7 and 8 show operation of outside pole 16 or 17. In FIG. 7, outside pole 16 or 17 is in the open position a distance f from contact 6 with leaf spring 20 not compressed. Leaf spring 20 has a depth of distance y. In FIG. 8, outside pole 16 or 17 is in the closed position with leaf spring 20 compressed. This position is obtained by advancing the actuating assembly the distance f+y towards magnet face 12.

Figure 9:
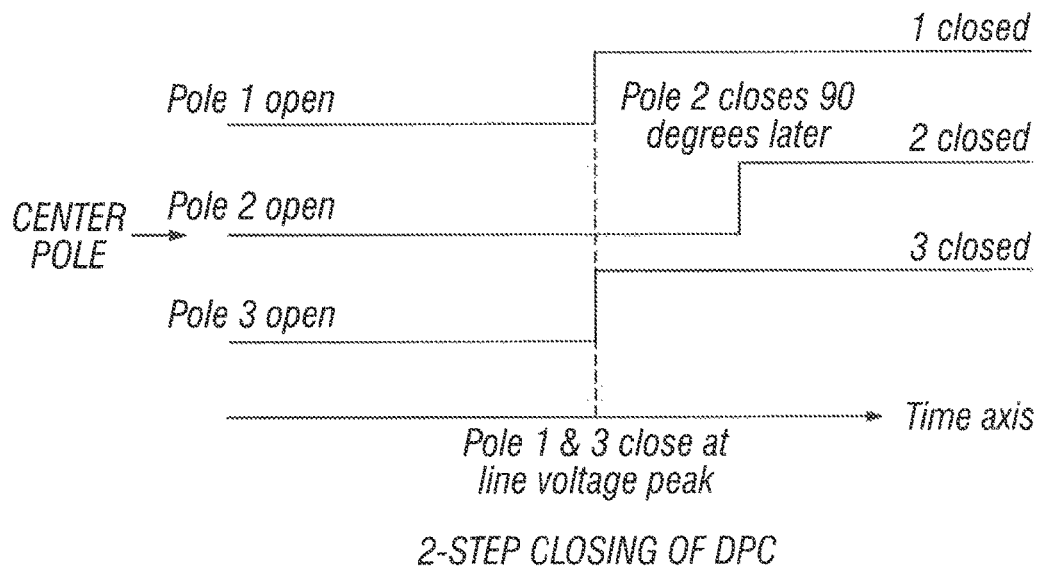
FIGS. 9 and 10 illustrate closing and opening timing sequences for the assembly.
Figure 10:
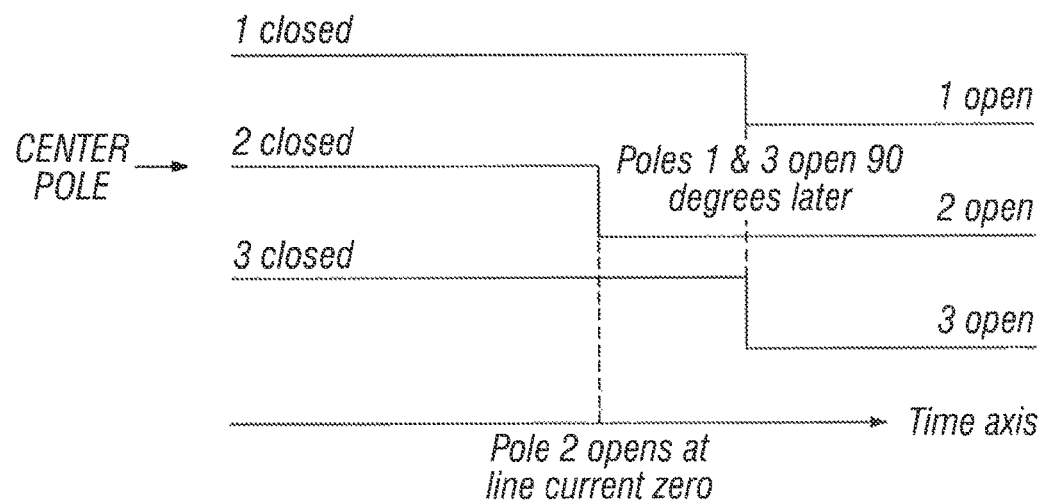

FIGS. 9 and 10 show the closing and opening timing sequences respectively of the DPC. During closing, outside poles 16 and 17 close at peak line voltage and center pole 18 closes 90 electrical degrees later During opening, center pole 18 opens at zero line current and outside poles 16 and 17 open 90 electrical degrees later.

Figure 11:
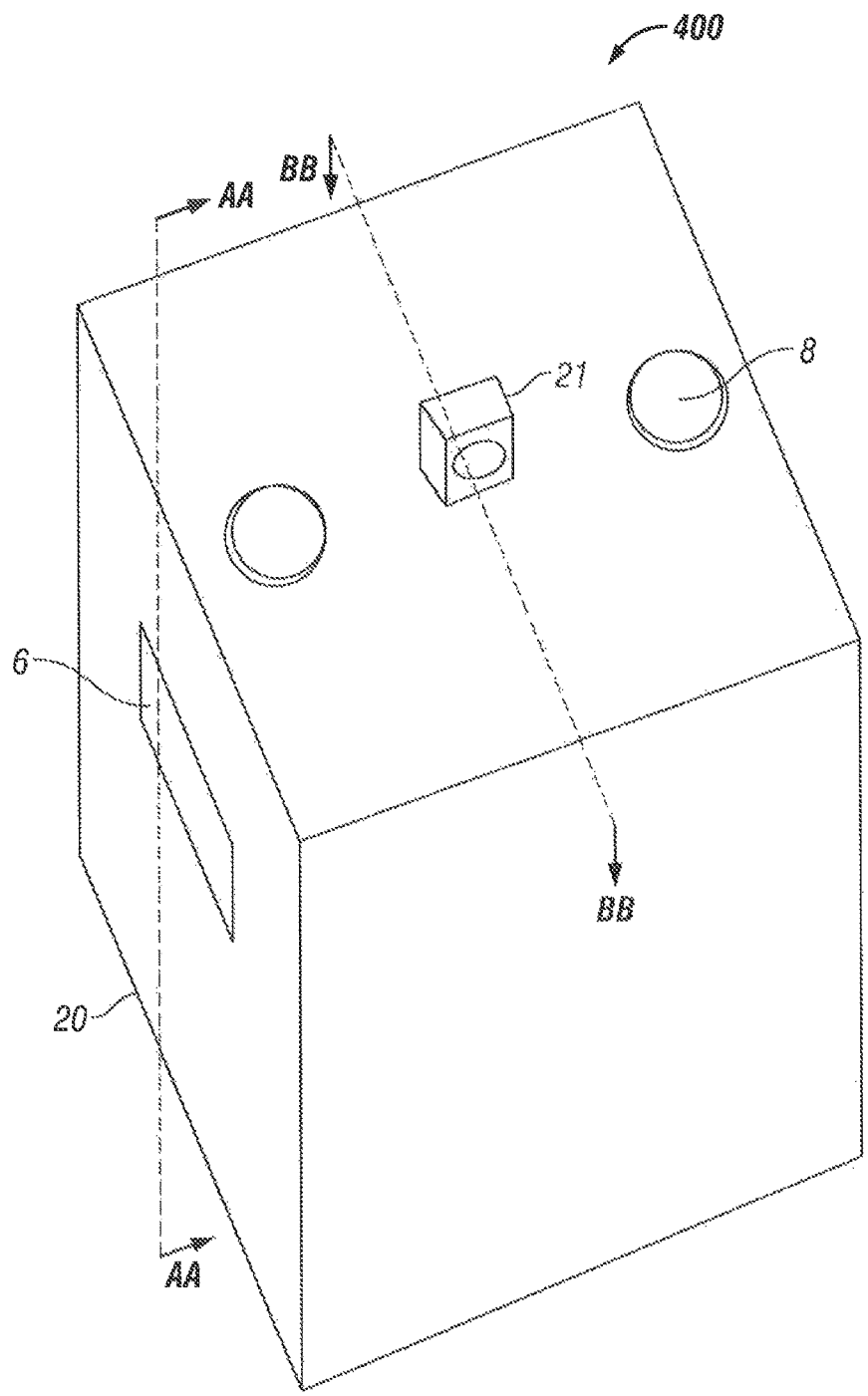
FIG. 11 illustrates an assembly which is an external view of an embodiment using Single Pole Switches (SPS)

FIG. 11 shows an assembly 400 incorporating Single Pole Switches (SPS). Assembly 400 includes an enclosure 20, combined terminations and fixed contacts 6, an extension of a moving contact carrier molding 21, and attachment points 8 where screws fasten the line and motor cables.

Figure 12:
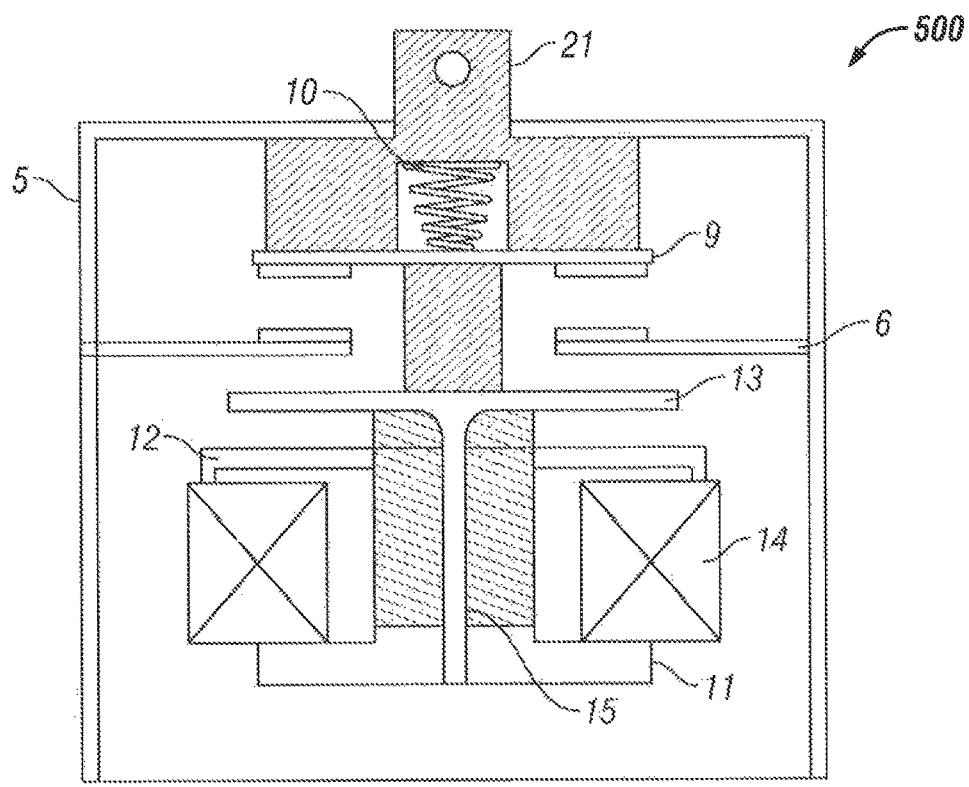
FIG. 12 illustrates a cross-section of the assembly of FIG. 11.

FIG. 12 shows a cross-section along line AA-AA of assembly 400. Assembly 400 includes moving contact 9 and spring 10 that provides contact pressure on closing. Iron magnet frame 11 supports magnet face 12 that mates with armature 13. Coil 14 energizes iron magnet frame 11 and spring 15 is used to open magnet face 12 when coil 14 is de-energized.

Figure 13:
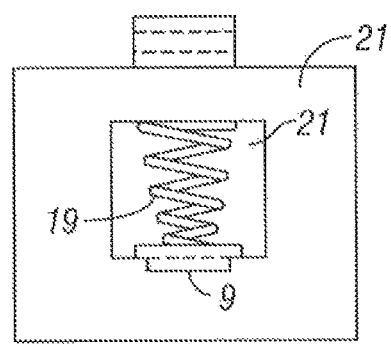
FIG. 13 illustrates another cross-section of the assembly of FIG. 11.

FIG. 13 shows a cross-section along line BB-BB of assembly 400. Assembly 400 includes moving contact carrier molding 21 with spring 19 determining a pressure between moving contact 9 and fixed contact 6.

Examples of Simultaneous Connection and Two-Step Connection

Figure 14:
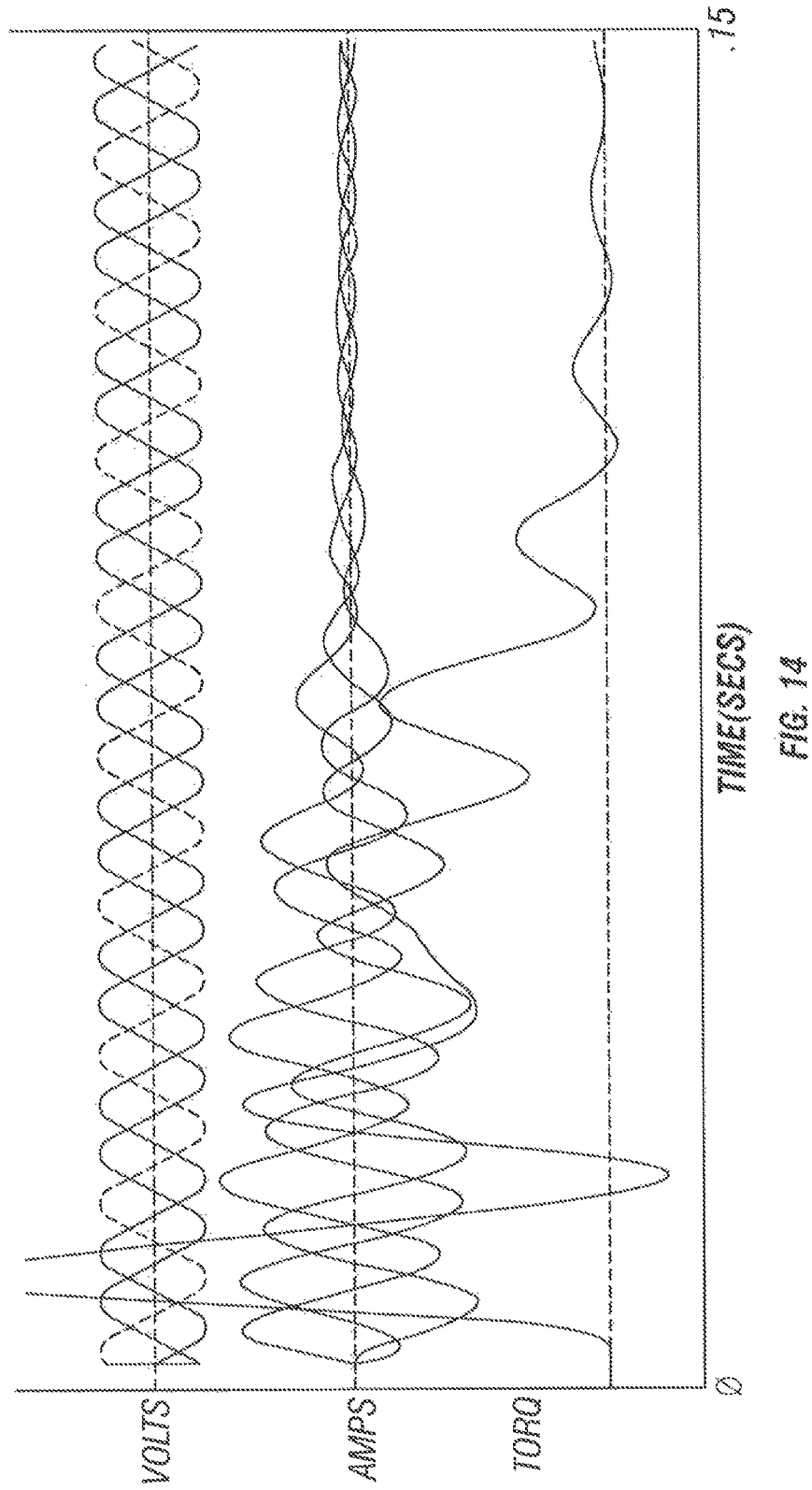
FIG. 14 illustrates a graph depicting an effect of a simultaneous connection of a three-phase supply to a delta connected motor.

FIG. 14 shows a timing graph depicting an effect of the simultaneous connection of a three-phase supply to a delta connected motor. The curves depict a start for an unloaded delta motor with simultaneous closure of contactor poles. The bottom trace shows the severe torque pulsation and the middle curves show the very unbalanced three-phase line current. The top traces show the supply voltages from the moment of connection.

Figure 15:
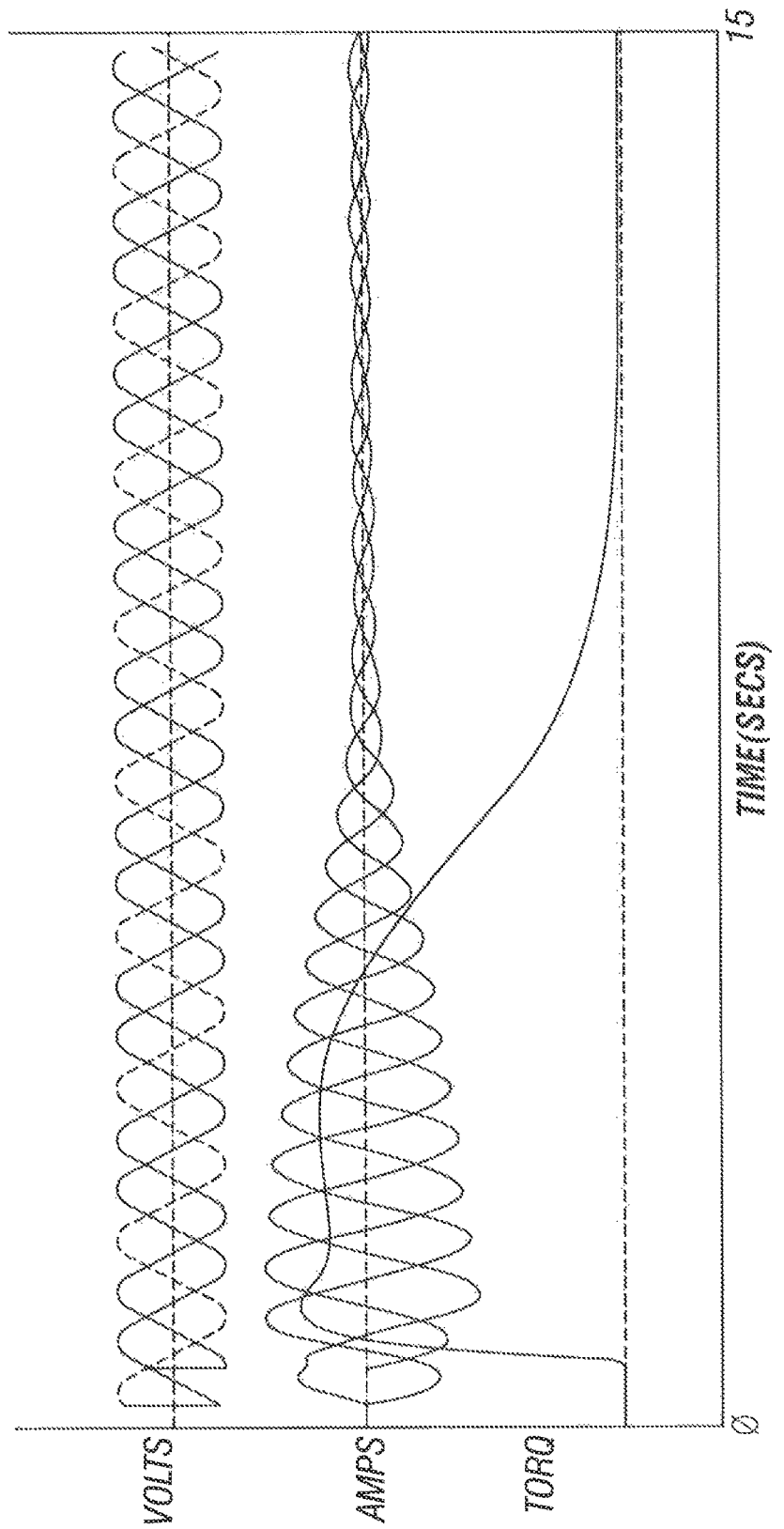
FIG. 15 illustrates a timing graph depicting an effect of a two step connection of a three-phase supply to a delta connected motor.

FIG. 15 shows a timing graph depicting an effect of the two-step connection of a three-phase supply to the same delta connected motor. Torque pulsation is virtually eliminated and the motor supply currents are balanced with significantly lower peak currents. The top voltage plots show the two-step connection timing sequence.

Theory of Two-step Connection

Figure 16:
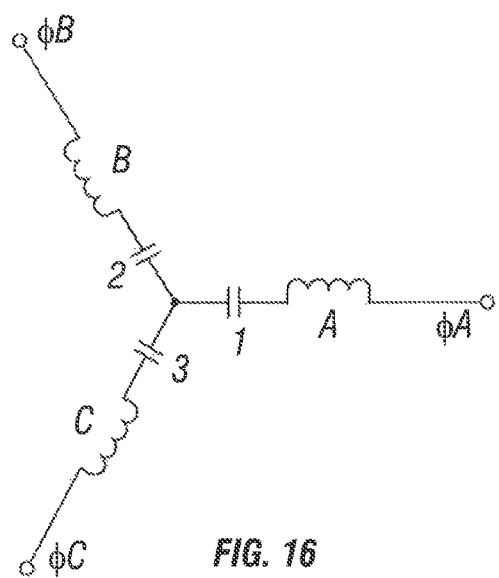
FIG. 16 illustrates an example set of connections for a motor in a wye configuration.

The following sections set out the theory for the two-step connection process and how it may be applied to both wye- and delta-configured motors using Delayed Pole Contactor (DPC) or Single Pole Switches. FIG. 16 illustrates an example set of connections for a motor in a wye-configuration. The contactor poles 1, 2, and 3 may be placed at either end of the windings.

DC Transient Due to Simultaneous Switching of Three Supply Phases

The three-phase supply voltage ABC may be described by a space vector $\bar{u}_S(t)$ given by:

$$\bar{u}_S(t) = u_S e^{j(\omega t + \alpha)} \quad (1)$$

where $u_S$ is the supply phase voltage amplitude, the space vector $\bar{u}_S(t)$ rotates at the angular frequency $\omega$ of the supply, and $\alpha$ is the supply phase angle at the time t=0 when power is applied.

The build up of flux $\bar{\psi}$ in the motor is given according to Faraday's Law by:

$$\frac{d\bar{\psi}}{dt} = \bar{u}_S(t) = u_S e^{j\omega t} e^{j\alpha} \quad (2)$$

By integration, $$\bar{\psi}(t) = u_S \frac{e^{j\omega t}}{j\omega} e^{j\alpha} + \bar{\psi}_{DC} \quad (3)$$

$$= \bar{\psi}(t)_{Steady\ state} + \bar{\psi}_{DC\ transient}$$

where $\bar{\psi}_{DC\ transient}$ is the constant of integration required to satisfy initial conditions. When $\bar{u}_S(t)$ is applied to the motor at t=0 at phase angle $\alpha$ with no flux in the motor (i.e. $\psi$=0):

$$\bar{\psi}(0) = 0 = u_S \frac{e^{j\alpha}}{j\omega} + \bar{\psi}_{DC}. \quad (4)$$

Hence the DC transient flux is given by:

$$\psi_{DC} = -u_S \frac{e^{j\alpha}}{j\omega} = j \frac{\bar{u}_S(0)}{j\omega} \quad (5)$$

so that the general solution for the flux is $$\bar{\psi}(t) = -j \frac{\bar{u}_S(t)}{\omega} + j \frac{\bar{u}_S(0)}{\omega} \quad (6)$$

$$= \bar{\psi}(t)_{Steady\ state} + \bar{\psi}_{DC\ transient}$$

Figure 17:
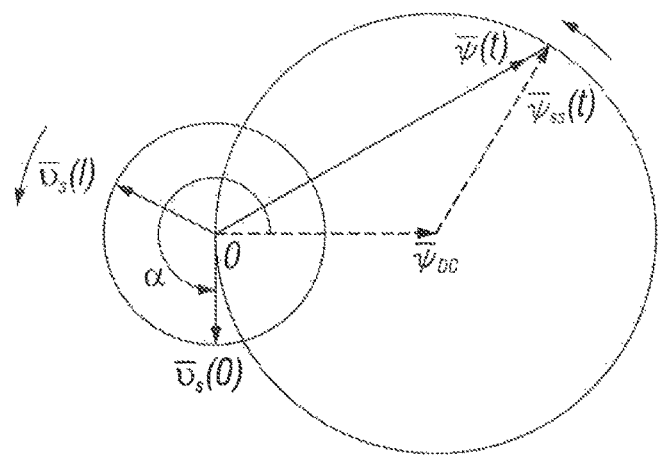
FIG. 17 illustrates a vector diagram for simultaneous closing of all contactor poles.

The factor $-j$ multiplying the voltage space vector $\bar{u}_S(t)$ in equation (6) means that the steady state flux $\bar{\psi}_{SS}(t)$ rotates with $\bar{u}_S(t)$ but lags behind in rotation by 90 degrees. The DC transient flux $\bar{\psi}_{DC}$ is on the other hand fixed in orientation 90° ahead of the direction of the initial supply vector $\bar{u}_S(t)$ at the moment of switch-on and only gradually decays away. FIG. 17 shows a space vector expressing the relations in equations (3), (5), & (6). The steady state flux $\bar{\psi}_{SS}(t)$ has constant amplitude and rotates about the fixed center determined by the transient $\bar{\psi}_{DC}$ which only decays away slowly. Hence, as $\bar{\psi}_{SS}(t)$ rotates, the presence of the DC flux $\bar{\psi}_{DC}$ causes the amplitude of the resultant flux $\bar{\psi}(t)$ to oscillate strongly. The effect is strong torque pulsations and unbalanced currents until the DC transient decays away.

Using a Two-step Connection Process to Greatly Reducing or Eliminate the DC Transient The DC transient may be greatly reduced or eliminated if the supply connection process is performed in two steps. While the embodiments for different motor combinations below describe the use of specific supply phases, any combination of supply phases that maintain the same timing and voltage aspects for the two-step connection described below are equally suitable. Indeed, the two-step connection described relates to operations that result in additional current flow into the motor. It is equally suitable to connect one phase of the motor at any time prior to these steps as long as it does not result in current flow into the motor. In such a case, current would only flow at the time a second phase of the motor was connected to the supply and would be equivalent to both phases being connected concurrently.

Step 1

Figure 18:
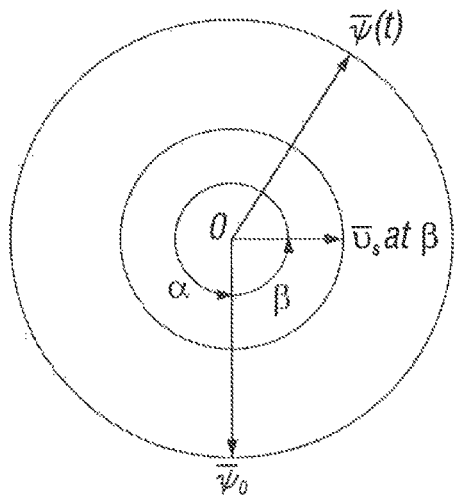
FIG. 18 illustrates a vector diagram for two-step connection of contactor poles.

FIG. 18 shows a vector diagram for a two-step connection of contactor poles. The minimum number of supply phases necessary to generate current flow in at least one motor winding are connected to the motor at time t=0. Time t=0 represents a time calculated to produce conditions required to allow the closure of the remaining phases (in step 2) while producing little or no DC transients. The current flow through the motor windings builds up flux $\overline{\psi}_0$ in the direction shown in FIG. 18.

Step 2

When the supply space vector described by space vector $\overline{u}_S$ is at orientation $\beta$ in FIG. 18, the remaining supply phases are connected to the motor. At this time, all three supply phases are connected and the voltage space vector and initial flux built up in Step 1 correspond to the correct steady state values without requiring any additional DC flux transient $\overline{\psi}_{DC}$. $\overline{\psi}(0)$ is the initial value of the steady state flux $$\overline{\psi}(t) = -j\frac{\overline{u}_S(t)}{\omega}$$

lagging 90° behind the instantaneous position at orientation $\beta$ of the voltage space vector $\overline{u}_S(t)$ at the moment when supply phase A is connected. Thereafter, the voltage $\overline{u}_S(t)$ and the flux $\overline{\psi}(t)$ synchronously, 90° apart, in their steady state without torque pulsations or excessive peak currents.

Applying Two-step Connection for Wye Configured Motors

The dq components of the voltage space vector applied to the motor are taken as $$u_{SD} = 2/3(u_{SA} - 0.5 \cdot u_{SB} - 0.5 \cdot u_{SC})$$

$$u_{SQ} = 1/\sqrt{3}(u_{SB} - u_{SC}) \quad (7)$$

where $u_{SA}$, $u_{SB}$, $u_{SC}$ are the voltages across the three windings. The CB line voltage is given in terms of the amplitude $u_S$ of the supply phase voltage by:

$$u_{CB} = \sqrt{3}u_S \sin(\omega t + \alpha) \quad (8)$$

Assuming supply phases B & C are connected when the line voltage $u_{CB}$ is at its peak and setting time t=0 at that point, then $\alpha = 270°$. Whilst only the B and C supply voltages are connected, and the A phase winding remains disconnected, the line voltage divides equally across the B and C windings, so that the winding voltages are given by:

$$u_{SB} = -\frac{1}{2}u_{BC}, \quad u_{SC} = \frac{1}{2}u_{BC}, \quad u_{SA} = 0 \quad (9)$$

Using Eq (7), the dq components are:

$$u_{SD} = 0, \quad u_{SQ} = -u_S \quad (10)$$

and $u_{SD}$ remains zero throughout the period $\beta$. Hence, during the 90° interval $\beta$ before phase A is connected, we have:

$$\frac{d\psi_Q}{dt} = u_{SQ} = -u_S \sin(\omega t + \alpha), \quad (11)$$

$$\frac{d\psi_D}{dt} = u_{SD} = 0$$

Integrating over the interval $\beta$ to obtain the flux gives:

$$\psi_Q = -u_S \int_{\omega t=0}^{\omega t = \pi/2} \sin(\omega t + \alpha) dt \quad (12)$$

so that when phase A is connected at $\omega t = \beta = \pi/2$:

$$\psi_D = 0, \psi_Q = -\frac{u_S}{\omega} \quad (13)$$

$$\overline{\psi}(\beta) = -j\frac{u_S}{\omega} \quad (14)$$

This is exactly the instantaneous steady state value $\overline{\omega}_0$ shown in FIG. 18 to enable starting without any decaying DC transient flux and associated torque pulsations and extreme current peaks.

Figure 19:
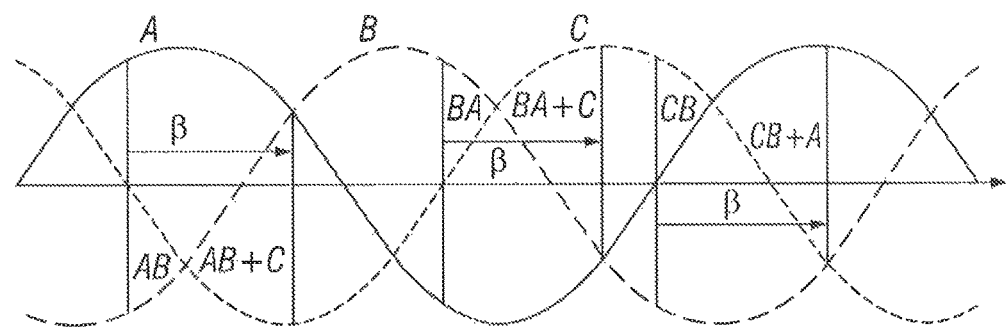
FIG. 19 illustrates the phase voltage waveforms of three of six possible connection timings for a two-step closing of a wye-configured motor.

FIG. 19 shows the phase voltage waveforms showing three of the six possible connection timings for two-step closing of a wye-configured motor. The vertical lines denote the times when at least one phase of the supply is expected to be connected such that current flow into the motor windings is increased. The delay represented by $\beta$ represents the period between the first connections resulting in current flow in the motor and the second connections resulting in all phases of the supply being connected the motor.

Applying Two-step Connection for Delta-Configured Motors (Connections Outside Delta)

Figure 20:
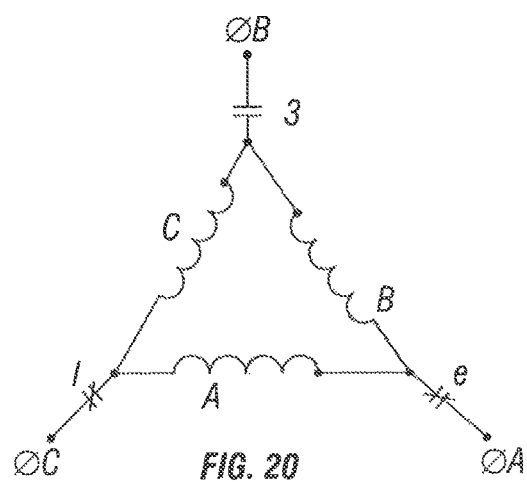
FIG. 20 illustrates a delta-configured motor with contactor poles connected outside the motor windings.

FIG. 20 illustrates a delta-configured motor with contactor poles connected outside the motor windings. When connecting a delta-configured motor using a two-step connection process, if the contactor poles are external to the delta, then the connection is done as for wye-configured motors by connecting two phases at their line amplitude peak by closing two poles as shown in FIG. 20. The remaining phase is then connected 90 degrees later by closing pole 3. In FIG. 20, phases A and C are the two phases initially closed, followed by phase B. The flux build up is now calculated. The CA line voltage is:

$$u_{CA} = \sqrt{3}u_S \sin(\omega t + \pi/2) \quad (15)$$

and when the CA phases are connected at the moment t=0 it equals its peak voltage $\sqrt{3}u_S$. Since there is no connection to the B phase, the voltage across the three windings is given by $$u_{SA} = \sqrt{3}u_S \sin(\omega t + \pi/2)$$

$$u_{SB} = \sqrt{3}/2 u_S \sin(\omega t + \pi/2)$$

$$u_{SC} = u_{SB} \quad (16)$$

Hence, using the dq voltage equations (7):

$$u_{SD} = \sqrt{3}u_S$$

$$u_{SQ} = 0 \quad (17)$$

Integrating the flux build up for the 90-degree period until phase B is connected gives:

$$\psi_{SD} = \int_0^{\omega t = \pi/2} u_{SD} dt \quad (18)$$

-continued $$= \sqrt{3}\, u_S \int_0^{\omega t = \pi/2} \sin(\omega t + \pi/2) dt$$

$$= \sqrt{3}\, \frac{u_S}{\omega}$$

This is the instantaneous steady state value $\overline{\psi}_0$ required to enable starting without any decaying DC transient.

Applying Two-step Connection for Delta-configured Motors (Connections within Delta)

Figure 21:
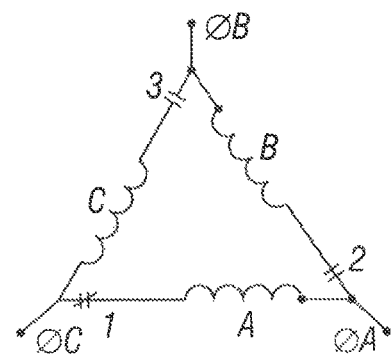
FIG. 21 illustrates a delta-configured motor with contactor poles inside the motor windings.

FIG. 21 shows a delta-configured motor with contactor poles inside the motor windings. If the contactor poles for delta operation are placed within the delta (as is normal for wye-delta starting), the current flow in at least one winding can be achieved by connecting one phase of the motor to the supply as shown in FIG. 21. In FIG. 21, current flows in winding A when pole 1 connects the switched side of winding A to the phase C supply.

Figure 22:
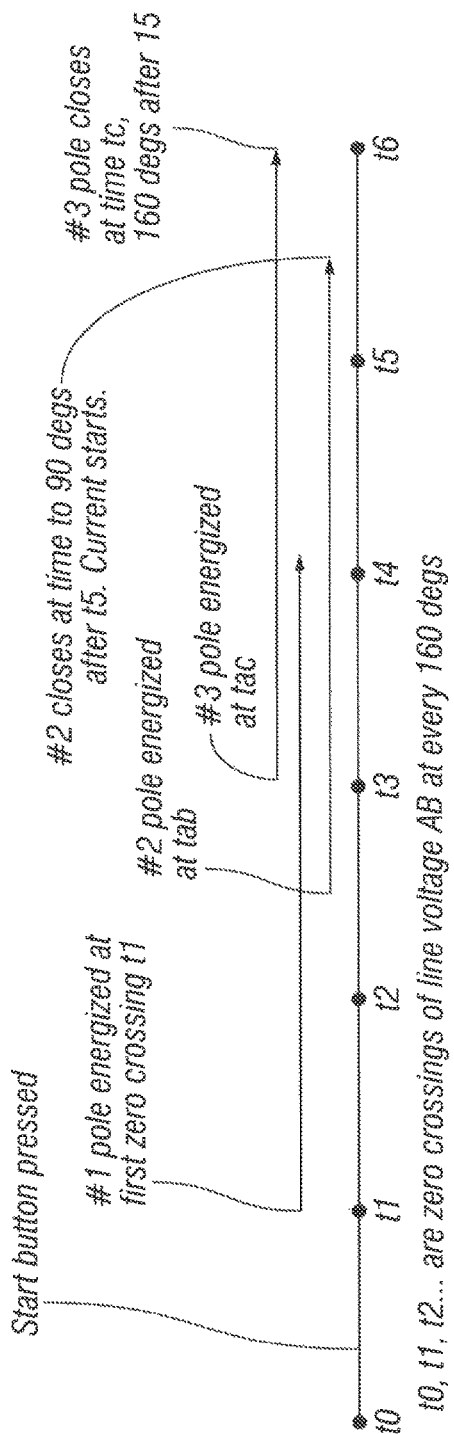
FIG. 22 illustrates a timing diagram for the first step closing at 60 electrical degrees for a delta-configured motor with contactor poles inside the motor windings.
Figure 23:
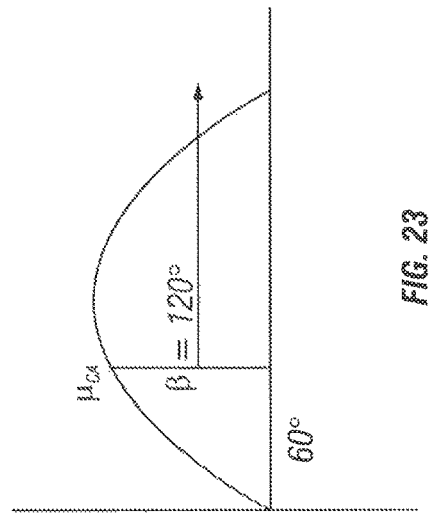
FIG. 23 illustrates a timing diagram for closure of individual contactor poles for two-step starting of a wye-configured motor.

FIG. 22 shows a modified timing diagram for the first step closing at 60 electrical degrees for a delta-configured motor with contactor poles inside the motor windings. Because no current flows in the B and C windings, flux must be built up over a longer period $\beta=120°$ starting at 60° phase angle of the line voltage $u_{CA}$, rather than for a period $\beta=90°$ starting at the voltage maximum.

The winding voltages with the line voltage $u_{CA}$ applied across the A winding in FIG. 21 are given by $$u_{SA} = \sqrt{3}\, u_S \sin \omega t,\; u_{SB} = 0,\; u_{SC} = 0 \tag{19}$$

From Eq. (7), the dq space vector voltages are given by:

$$u_S = \frac{2}{3}\sqrt{3}\, u_S \sin \omega t \tag{20}$$

$$u_{SQ} = 0$$

Hence, by integrating over period $\beta$, the flux becomes:

$$\psi_{SD} = \int_{\pi/3}^{\pi} u_{SD} dt = \sqrt{3}\, \frac{u_S}{\omega} \tag{21}$$

$$\psi_{SD} = 0 \tag{22}$$

This is the correct flux and orientation to enable contactor poles 2 and 3 to be closed at the zero crossing of the CA line voltage to apply full voltage to all windings of the motor without any DC transient.

Two-step Connections Using Single Pole Switches (SPS)

Single Pole Switches have a DC operated electromagnet with electronic coil control operating a single set of fixed and moving contacts in an individual enclosure per FIGS. 11 and 12. Armature 13 in FIG. 12 is acted upon by a magnetic field produced by the electromagnet coil 14 to control the connection and disconnection of contacts 6 and 9. They are used to connect individual phases of the supply to the motor as described in the three motor connection configurations described earlier. Because they allow for the independent control over the connection of each phase of the supply to a motor, they are well suited for use with a two-step closure process.

Applying Two-step Connection for Wye-configured and Delta-configured (Connections Outside) Motors Using SPS To start a wye-configured motor as shown in FIGURE or a delta-configured motor as shown in FIG. 20 using a two-step connection process, the three contactor poles 1, 2, and 3 must be closed in the correct sequence at the desired points on the supply waveforms. For the first step of the process, two poles must connect the motor to the supply such that current first begins to flow in at least one motor winding at the peak voltage amplitude (approximately 90 degrees after the line-to-line zero-crossing of the two phases being connected). This can be accomplished by concurrently connecting both poles at this point on the supply waveform or by closing one pole at an earlier time and the other at this point on the supply waveform. Both approaches are equally suitable, though the latter may prove easier to implement. The remaining pole should be closed approximately 90 degrees later on the supply waveform.

Applying Two-step Connection for Delta-configured (Connections within Delta) Motors Using SPS To start a delta-configured motor as shown in FIGURE using a two-step connection process, the three contactor poles 1, 2, and 3 must be closed in the correct sequence at the desired points on the supply waveforms. For the first step of the process, one pole must connect the motor to the supply such that, current first begins to flow in one motor winding at a point 30 degrees prior to the peak voltage amplitude (approximately 60 degrees after the line-to-line zero-crossing of the two phases being connected). The remaining two poles should be closed approximately 120 degrees later on the supply waveform.

Controlling Connection Times

To satisfy the timing required for the two-step connection process, the contact closure times for the SPS must be known. This contact closure time represents the time from energizing the SPS magnetic coil until the contacts allow current to flow from the supply to the motor. This information can typically be gained by characterizing the design after it is in production.

It is also required to know the supply frequency and zero-cross timing. At present we believe that using the well known method of a software-based Phase Locked Loop (PLL), synchronized to the supply voltage crossings of one or more supply phases, is the easiest to implement and is best for this purpose. However, many methods exist for determining supply frequency and zero-cross timing that are equally suitable and may be preferred if other features, such as voltage monitoring and supply phase sequence, are also derived from the means to monitor voltage.

By monitoring the supply and knowing the contact closure times for the SPS, the times to energize the various SPS coils can be calculated such that connections between the supply and the motor occur at the desired points on the supply waveform. One embodiment of a formula for calculating these coil energizing times would be:

$$t_{CE} = t_{ZC} + d_{Offset} \times t_{Degree} - t_{CC}$$

where $t_{CE}$ is the time at which the coil is to be energized, $t_{ZC}$ is the time of the zero-cross the estimated time is to be based on, $d_{Offset}$ is the offset in degrees of the supply waveform from $t_{ZC}$ that the connection of the supply to the motor is desired, $t_{Degree}$ is the time period equal to one degree of the supply waveform, and $t_{CC}$ is the period from when the SPS coil is energized to when the contacts allow current to flow from the supply to the motor.

Two-step Connections Using a Delayed Pole Contactor (DPC)

An alternative to Single Pole Switches in implementing the two-step connection process is a Delayed Pole Contactor. This design is a three-pole contactor with the contacts arranged to close asynchronously at the preferred angles for the two-step connection process. The center pole is magnetically arranged to close later than the outer poles.

For contactor closing, the moving contact carrier has contact springs operating on contacts assembled in pole windows. The center contact is offset from the contacts of the two outer poles by having the center window smaller by the amount x. Using identical contacts and modifying the molded contact carrier gives the desired early closure of the outer poles. The contactor electromagnet is controlled so as to stall in this interim step one position.

In the step one of closing, the contact gap h in the center pole is of sufficient dielectric strength to avoid conduction for approximately a quarter of the mains cycle following the contact closure of the outer two poles. This gap h is typically 0.5 mm to 1 mm depending on size of contactor.

The power into the contactor-operating coil is controlled, such that in conjunction with the center contact physical offset and other contactor dynamics, so as to close the outer poles to this stalled position for a period equal to 90 electrical degrees of the supply frequency.

The power into the contactor operating coil is then adjusted such that the contact springs in all poles are compressed past distance d, positioning the DPC in its final closed position.

Optionally, after a short delay of approximately one second to allow stability, the power into the contactor-operating coil is reduced to a level sufficient to keep the contactor in the closed position.

Figure 24:
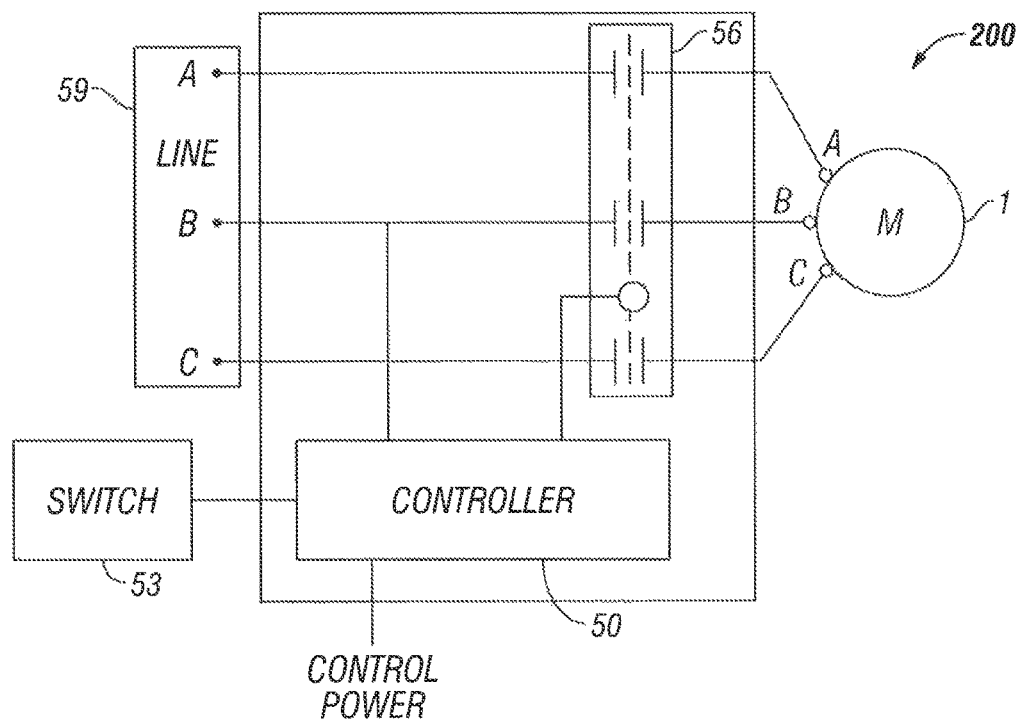
FIG. 24 illustrates a motor circuit using a three-pole Delayed Pole Contactor (DPC)
Figure 25:
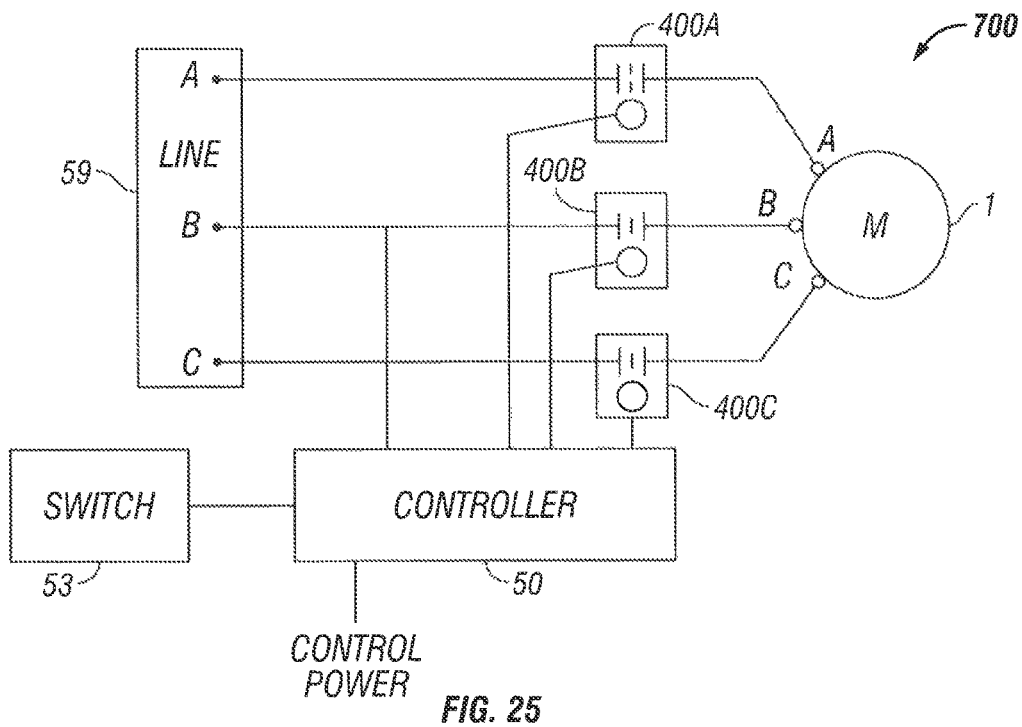
FIG. 25 illustrates a motor circuit using Single Pole Switches (SPS).

FIG. 24 shows a motor circuit using a three-pole Delayed Pole Contactor (DPC) while FIG. 25 shows a motor circuit using Single Pole Switches (SPS). In each motor circuit, a switch 53 is coupled to a controller 50. Controller 50 regulates power to the respective actuator assembly of the respective contactor in order to engage and disengage the contacts in accordance with the two-step connection. Controller 50 operates in association with a voltage zero-crossing monitor in regulating the power being applied.

Although the present disclosure has been described in detail with reference to particular embodiments, it should be understood that various other changes, substitutions, variations, alterations, and modifications may be ascertained by those skilled in the art and it is intended that the present disclosure encompass all such changes, substitutions, variations, alterations, and modifications as falling within the spirit and scope of the appended claims. Moreover, the present disclosure is not intended to be limited in any way by any statement in the specification that is not otherwise reflected in the appended claims.

What is claimed is:

1. A method of switching electrical contacts comprising:
monitoring voltage in an electrical system having a power source and a load;
closing first and second direct current electromagnetically controlled contacts for first and second phases of electrical power at or before a first phase angle determined based on voltage zero-crossing; and
thereafter closing third direct current electromagnetically controlled contacts for a third phase of electrical power at a prescribed moment following the closing of the first direct current electromagnetically controlled contacts;
wherein the first, second, and third electromagnetically controlled contacts are provided in windows of a common carrier and the window in which the third direct current electromagnetically controlled contacts are disposed is offset with respect to the windows in which the first and second direct current electromagnetically controlled contacts are disposed to provide the closure of the first and second direct current electromagnetically controlled contacts before the closure of the third direct current electromagnetically controlled contacts.

2. The method of claim 1, wherein the prescribed moment is a second phase angle of the voltage in the system measured relative to the first phase angle.

3. The method of claim 2, wherein the load comprises an electric motor, and wherein when the motor windings are in a wye configuration, the first phase angle is approximately 60 degrees and the second phase angle is approximately 90 degrees.

4. The method of claim 2, wherein the load comprises an electric motor, and wherein when the motor windings are in a delta configuration and the direct current electromagnetically controlled contacts carry current for more than one motor winding, the first phase angle is approximately 60 degrees and the second phase angle is approximately 90 degrees.

5. The method of claim 2, wherein the load comprises an electric motor, and wherein when the motor windings are in a delta configuration and the direct current electromagnetically controlled contacts carry current for one motor winding, the first phase angle is approximately 30 degrees and the second phase angle is approximately 120 degrees.

6. The method of claim 1, wherein monitoring voltage in an electrical system is performed via a phase locked loop.

7. A contactor assembly comprising:
a plurality of movable contacts that, when moved to a closed position contact respective stationary contacts;
means for monitoring voltage zero-crossings on power applied to at least one of the plurality of movable contacts; and
a controller in operable association with the means for monitoring voltage zero-crossings and the plurality of movable contacts and configured to engage first and second of the plurality of movable contacts when the controller receives a close circuit command signal, and thereafter to engage a third of the movable contacts;
wherein the first, second, and third movable contacts are provided in windows of a common carrier and the window in which the third movable controlled contacts are disposed is offset with respect to the windows in which the first and second movable contacts are disposed to provide the closure of the first and second movable contacts before the closure of the third movable contacts.

8. The contactor assembly of claim 7, wherein the plurality of movable contacts includes at least one movable contact for each phase of a poly-phase power source.

9. The contactor assembly of claim 8, wherein the controller is configured to disengage the third movable contacts prior to disengaging the first and second movable contacts by movement of the common carrier.

10. The contactor assembly of claim 9, wherein the controller is configured to engage the first and second movable contacts at approximately the same time.

11. The contactor assembly of claim 9, wherein the controller is configured to disengage the first and second direct current electromagnetically controlled contacts at approximately the same time.

12. The contactor assembly of claim 7, wherein the means for monitoring voltage zero-crossings on power comprises a phase locked loop.

13. The contactor assembly of claim 7, wherein the controller comprises a DC electromagnet.

14. A method of switching electrical contacts comprising:
monitoring voltage in an electrical system having a power source and a motor;
closing first and second direct current electromagnetically controlled contacts at or before a first phase angle following a phase voltage zero-crossing such that current begins to flow in at least one winding at approximately the first phase angle following a phase voltage zero-crossing, the direct current electromagnetically controlled contacts configured to regulate power supplied to the motor by the power source; and
thereafter closing third direct current electromagnetically controlled contacts at a prescribed moment following the closing of the first direct current electromagnetically controlled contacts;
wherein, when the motor windings are in a wye configuration, the first phase angle is approximately 60 degrees and the second phase angle is approximately 90 degrees; and
wherein the first, second, and third electromagnetically controlled contacts are provided in windows of a common carrier and the window in which the third direct current electromagnetically controlled contacts are disposed is offset with respect to the windows in which the first and second direct current electromagnetically controlled contacts are disposed to provide the closure of the first and second direct current electromagnetically controlled contacts before the closure of the third direct current electromagnetically controlled contacts.

15. The method of claim 14, wherein, when the motor windings are in a delta configuration and the direct current electromagnetically controlled contacts carry current for more than one motor winding, the first phase angle is approximately 60 degrees and the second phase angle is approximately 90 degrees.

16. The method of claim 14, wherein, when the motor windings are in a delta configuration and the direct current electromagnetically controlled contacts carry current for one motor winding, the first phase angle is approximately 30 degrees and the second phase angle is approximately 120 degrees.

17. The method of claim 14, wherein the method is performed in a multi-step connection process.

18. The method of claim 17, wherein the multi-step connection process transitions between a wye configuration and a delta configuration.

19. The method of claim 14, wherein the power source comprises a three-phase power source, and the direct current electromagnetically controlled contacts are closed to provide power to three-phase windings of the motor.

20. The method of claim 14, wherein monitorin voltage in an electrical system is performed via a phase locked loop.

* * * * *